United States Patent [19]
Stachnik

[11] 3,917,408
[45] Nov. 4, 1975

[54] NAVIGATION AID
[75] Inventor: William J. Stachnik, New London, Conn.
[73] Assignee: The United States of America as represented by the Secretary of the Navy, Washington, D.C.
[22] Filed: Feb. 12, 1973
[21] Appl. No.: 334,174

[52] U.S. Cl. .............. 356/116; 73/170 A; 250/225; 356/114; 356/118; 356/119
[51] Int. Cl.² .......................................... G01J 4/02
[58] Field of Search .......... 356/114, 115, 116, 117, 356/118, 119; 250/225; 73/170 A

[56] References Cited
UNITED STATES PATENTS
3,580,681  5/1971  Andre Robert ..................... 250/225
3,672,772  6/1972  Primak .............................. 356/114
3,721,500  3/1973  Fugitt ................................ 356/118

Primary Examiner—Richard A. Farley
Assistant Examiner—S. C. Buczinski
Attorney, Agent, or Firm—Richard S. Sciascia; Arthur A. McGill; Prithvi C. Lall

[57] ABSTRACT

An apparatus for monitoring the underwater luminous field with an underwater vehicle, to determine, while submerged, the conditions of sea surface and cloud cover and locate the vehicle's position by solar navigating techniques. The apparatus measures underwater polarization of solar light in magnitude and its spatial distribution as a function of time and thus determines the condition of sea surface and cloud cover, while submerged at operational depths.

6 Claims, 2 Drawing Figures

NAVIGATION AID

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an apparatus for determining sea and weather conditions, while submerged, and more specifically to an underwater polarimeter for navigation and for the determination of sea surface and atmospheric conditions.

There are several active means of determining sea state while submerged. One of these methods uses high frequency acoustics. However, such active methods can easily reveal intended covert operations. Passive devices such as pressure sensors can also measure the sea state, but they must be close to the surface of the sea before pressure changes due to variation in the height of waves is large enough to measure. Furthermore, there is no satisfactory method for determining cloud cover, while submerged at operational depths.

A number of measurements have shown that light emitted by the sun is unpolarized. However, as this light travels through an unclouded atmosphere, it becomes polarized. Additional light polarization inducing interactions take place at the air-sea interface as well as when this light propagates below the sea surface. The extent of light polarization underwater depends upon a number of factors including sea and weather conditions. However, the prior art lacks a satisfactory covert method of determining sea surface and weather conditions, while submerged at operational depths, involving variations in polarization of sunlight.

SUMMARY OF THE INVENTION

The objects and advantages of the present invention are accomplished by using an underwater polarimeter for navigation and for the determination of sea surface and atmospheric conditions. The underwater polarimeter comprises a pressure window through which sunlight traveling through the sea water is allowed to fall on a rotational linear polarizer and the polarized light is allowed to fall on a high gain photomultiplier tube. The output of the photomultiplier tube is displayed on a storage oscilloscope. Any changes in the luminous field due to sea surface conditions and cloud cover vary the amount of light passing through the rotational linear polarizer. The resulting changes in output of the photomultiplier as displayed on the storage oscilloscope are then correlated with the sea surface and atmospheric conditions, while submerged at operational depths.

One object of this invention is to use an underwater polarimeter for navigation and determination of sea state and atmospheric conditions, while submerged at operational depths.

Another object of this invention is to study the luminous field underwater.

Still another object of this invention is to determine sea surface and atmospheric conditions, while submerged at operational depths, without revealing intended covert operations.

An additional object of this invention is to use an underwater polarimeter as a back-up navigational aid which is independent of magnetic field anomalies and inertial guidance system, involving very small power consumption.

Still another object of this invention is to extract useful information from the study of ambient luminous field, while submerged at operational depths.

Still another object of this invention is to locate solar azimuth, while submerged underwater at operational depth, on clear days with calm seas.

An additional object of this invention is to measure water clarity if surface and meteorological conditions are known.

Other objects, advantages and novel features of the invention will become apparent from the following detailed description of the invention when considered in conjunction with the accompanying drawings wherein:

DESCRIPTION OF A PREFERRED EMBODIMENT

Figure 1:
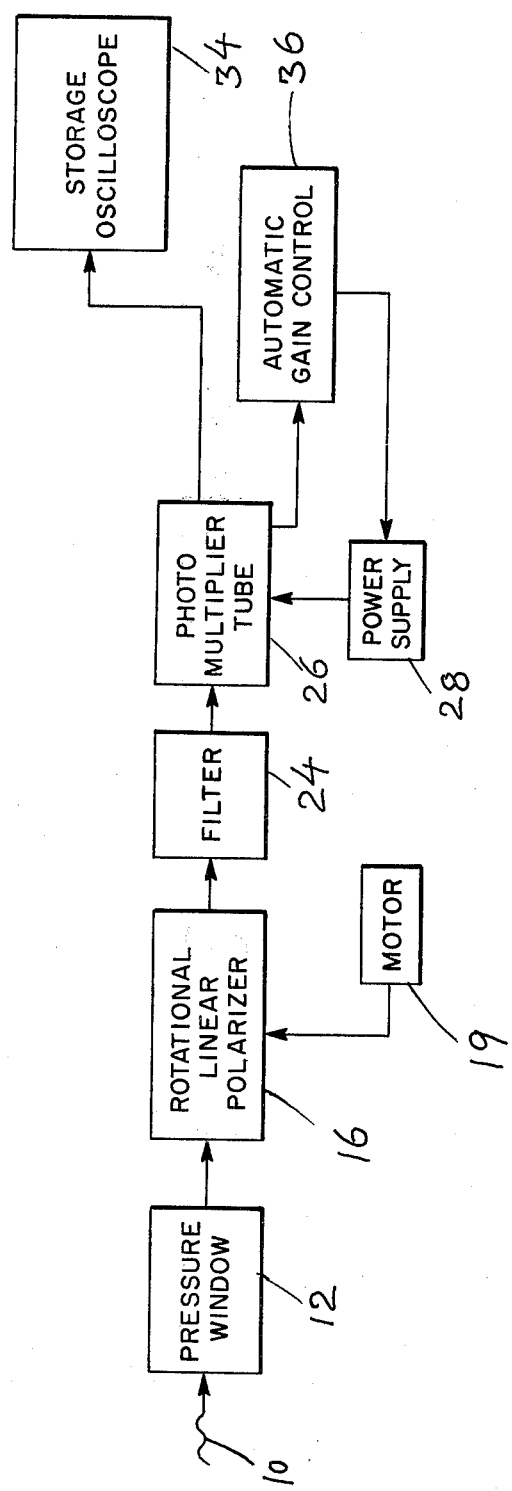
FIG. 1 is a block diagram illustrating the component elements of an underwater polarimeter representing an embodiment of this invention.
Figure 2:
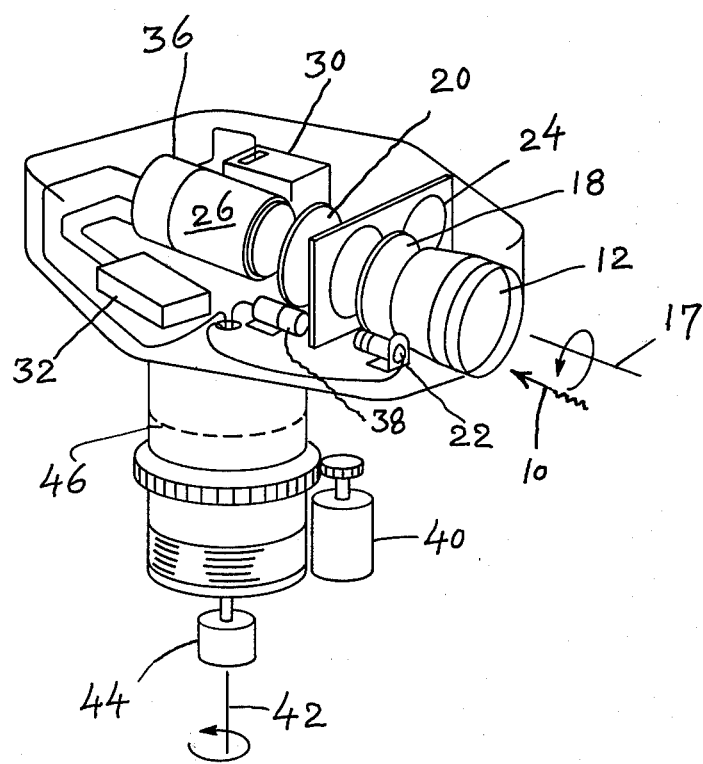
FIG. 2 is a perspective view of the underwater polarimeter.

Referring to the drawings wherein like reference characters designate identical or corresponding parts throughout and more particularly to FIG. 1 thereof, a block diagram of the elements of an underwater polarimeter is shown. Polarized light underwater shown by arrow 10 is allowed to pass through a transparent window 12 under pressure which is a part of the polarimeter housing 14 of FIG. 2. The light after transmission through the pressure window is allowed to fall on a rotational linear polarizer 16 mounted in housing 14. Polarizer 16 includes a light analyzer 18, a depolarizer 20, and a conventional analyzer position indicator 22. Analyzer 18 can be rotated about a horizontal axis 17 by means of a conventional motor 19. The light coming out of the rotational analyzer 18 is then allowed to fall on a filter 24 which is a red filter in coastal waters and a blue filter in deep waters signifying the difference in color of light scattered at different types of water. The polarized light coming out of filter 24 is then allowed to fall on the cathode electrode of a photomultiplier tube 26 which is biased by a standard high voltage power supply represented by block 28. The high voltage supply includes a low voltage DC battery supply 30 and a high voltage inverter supply 32 to convert low DC voltage from battery supply 30 to high DC voltage to bias photomultiplier tube 26. The output of photomultiplier tube 26 is stored on a storage oscilloscope 34. In order to account for variations in polarized light intensity coming out of rotational linear polarizer 16 up to 10 decades, an automatic gain control 36 is used together with the power supply 28 to increase the capability of the photomultiplier tube used from its gain of 4 decades to desirable gain of 10 decades. The photomultiplier tube 26 is magnetically shielded to minimize the effect of earth's magnetic field. The photomultiplier 26 used in this embodiment is preferably RCA 7265. However, any other high gain photomultiplier tube can also be used without deviating from the spirit of this invention. Automatic gain control 36 in the power supply circuit of the photomultiplier is a standard high gain operation amplifier. The storage oscilloscope 36 is preferably a tektronix Scope Model 611. It has been found that the color of filter 18 is red in coastal waters and blue in deep waters for best results as the color of light scattered in water depends upon the molecular and particulate composition of water. Numeral 38 represents a conventional filter switching drive mechanism diagrammatically shown in FIG. 2. A conventional motor 40, as shown in FIG. 2 is used to rotate the underwater polarimeter about a vertical axis 42 and azimuth position indicator 44 indicates the polarimeter's azimuth position at any time. It is desirable that the rotational frequency of the housing is greater than the frequency of any natural occurring variation in the marine light field. Although the polarimeter rotates about the vertical axis 42 as the analyzer rotates, yet the rotational frequency of the analyzer 18 about a horizontal axis 19 is much greater, preferably 180 times the rotational frequency of the polarimeter about axis 42 to produce one maxima for each degree of polarimeter rotation if operating in a homogeneous field of polarized light. Line 46, as shown in FIG. 2, indicates the position of the seal to make the polarimeter housing 14 to be water tight.

For the purpose of navigation, the scan locates the solar azimuth relative to the vehicle. this is determined by either noting the azimuth position of the polarimeter where the output of the photomultiplier is displayed on the oscilloscope 34 is maximum or by determining the angle midway between the two successive azimuth positions of the polarimeter which show greatest change in light polarization. The depolarizer 20 in front of the photomultiplier 26 eliminates the polarization favoring abnormalities of some photomultipliers used. The light that comes from the sun is collimated but depolarized by depolarizer 20. If the air is clear and there are no clouds, the light field under calm seas is very orderly and predictable in its polarization and intensity. The factors which cause polarization are (1) Rayleigh scattering in the atmosphere, particularly the incoherent scattering of the upper atmosphere; (2) the polarization effects occurring when the light is deflected through the surface of a dielectric such as sea surface in this case; and (3) Rayleigh scattering of light as it propagates into the sea. Thus, on a clear day with no clouds, calm sea and sun not at zenith, the underwater polarimeter of subject invention will give rise to rather diffused polarization pattern as a function of azimuth angle as read on storage scope 34. However, on a clear day with no clouds and sun not at zenith, and the sea having waves on its surface, the polarization pattern will go through a series of maximum intensity, minimum polarization and minimum intensity, maximum polarization patterns as a function of time for a certain azimuth angle. The wave surfaces focus the incident optical energy like a cylindrical lens. Areas where the rays converge are areas where the Rayleigh scattering from the rays has a lesser degree of polarization in spite of larger energy density at that point. To determine sea state, one measures the time period between two consecutive points of maximum intensity and minimum polarization. The period of a wave and the height thereof are related by a simply unambiguous mathematical relationship.

Low and dense clouds will blank out part of the return. On the other hand, low diffused clouds will reduce the collimation and obliterate both lensing effects and refraction effects. Thus, any changes in collimation are correlated with the cloud cover.

Thus an underwater polarimeter of this invention comprises a housing having a pressurized transparent window. A light analyzer capable of a horizontal rotational motion is mounted in the housing. The analyzed light is then converted into electrical signals by using a high gain photomultiplier. The output of the photomultiplier is displayed on a storage oscilloscope. In order to accommodate wide variations in the magnitude of the polarized light, an automatic gain control is incorporated in the photomultiplier circuit.

Obviously many modifications and variations of the present invention are possible in the light of above teachings. As an example, a different method of measuring the intensity of polarized light after it passes through the light analyzer is possible. Furthermore, a different method of keeping the gain of the photomultiplier constant over the entire range of intensities of polarized light may be used.

It is therefore understood that within the scope of the appended claims the invention may be practiced otherwise than as specifically described.

I claim:

1. An underwater polarimeter system comprising:
   a water tight housing having a transparent window;
   a light analyzer mounted in said housing, said analyzer being rotatable in a first plane at a first rotational frequency and also being in communication with said transparent window;
   a photomultiplier housing in said housing and coupled to the output of said analyzer;
   means for biasing said photomultiplier;
   means for displaying the output of said photomultiplier; and
   means for rotating said housing in a second plane generally perpendicular to the first plane of rotation of said analyzer at a second rotational frequency substantially smaller than the first rotational frequency of said rotational analyzer.

2. The polarimeter system of claim 1 wherein means for biasing said photomultiplier includes a battery supply and an inverter supply.

3. The polarimeter system of claim 2 wherein the means for biasing said photomultiplier further comprises an automatic gain control circuit.

4. The polarimeter system of claim 3 wherein said automatic gain control circuit in said means for biasing said photomultiplier includes a high gain operational amplifier.

5. A method for determining weather conditions while submerged in water which comprises the steps of:
   analyzing sunlight transmitted in the water using an optical analyzer;
   converting the analyzed sunlight into electrical signals using electronic means;
   storing said electrical signals on a storage oscilloscope; and
   correlating variations in the analyzed sunlight to the weather and sea surface conditions.

6. The method of claim 5 wherein the step of correlating variations in the analyzed sunlight to the weather and sea surface conditions further comprises the steps of:
   plotting a graph between the amplitude of the analyzed sunlight and time; and
   determining the time between two consecutive maxima in the plotted graph.

* * * * *